US010701111B2

United States Patent
Didenko et al.

(10) Patent No.: US 10,701,111 B2
(45) Date of Patent: Jun. 30, 2020

(54) METHOD AND APPARATUS FOR DEVICE MANAGEMENT

(71) Applicant: Alcatel-Lucent USA Inc., Murray Hill, NJ (US)

(72) Inventors: Nikolai V Didenko, Perkasie, PA (US); Matthew Morris, Round Rock, TX (US); John L Engquist, Cedar Park, TX (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 199 days.

(21) Appl. No.: 14/871,480

(22) Filed: Sep. 30, 2015

(65) Prior Publication Data

US 2016/0301576 A1    Oct. 13, 2016

Related U.S. Application Data

(60) Provisional application No. 62/145,901, filed on Apr. 10, 2015.

(51) Int. Cl.
*H04L 29/06* (2006.01)
*H04W 8/24* (2009.01)
(Continued)

(52) U.S. Cl.
CPC ........... *H04L 65/1069* (2013.01); *H04W 4/14* (2013.01); *H04W 8/22* (2013.01); *H04W 8/245* (2013.01)

(58) Field of Classification Search
CPC ...... H04L 41/12; H04L 65/1069; H04W 4/14; H04W 8/245; H04W 8/22
See application file for complete search history.

(56) References Cited

U.S. PATENT DOCUMENTS 5,892,903 A * 4/1999 Klaus .................... G06F 21/577
                                                    709/227
8,688,162 B1 * 4/2014 Shah ..................... H04W 76/00
                                                    370/218
(Continued)

FOREIGN PATENT DOCUMENTS

WO    WO 2015/036793 A1 *  3/2015  ............ H04W 12/06

OTHER PUBLICATIONS

ETSI, "GSM 03.40—Digital cellular telecommunications system (Phase 2+); Technical realization of the Short Message Service (SMS) Point-to-Point (PP)", Version 5.3.0: Jul. 1996, pp. 1-12. (Year: 1996).*

(Continued)

*Primary Examiner* — Brian J. Gillis
*Assistant Examiner* — Chhian (Amy) Ling
(74) *Attorney, Agent, or Firm* — Loza & Loza, LLP; Jessica W. Smith

(57) ABSTRACT

A process and apparatus for managing remote devices, for example subscriber mobile devices in a mobile communication network. Apparatus, such as a device management server, transmits a device management initiation message to a managed device such as a mobile device operating within a mobile network. If the message is not received or unsuccessful in establishing a device management communication session, another device management initiation message may be sent. If the device management session may still not begin, the device management server sends a device management client reset message to the managed device. After expiration of a client reset timer, an additional device management initiation message is transmitted.

18 Claims, 3 Drawing Sheets

(51) Int. Cl.
  *H04W 8/22*  (2009.01)
  *H04W 4/14*  (2009.01)

(56) References Cited

U.S. PATENT DOCUMENTS

| | | | | |
|---|---|---|---|---|
| 9,479,395 | B2* | 10/2016 | Waas | G06F 11/0709 |
| 2003/0120820 | A1* | 6/2003 | Chen | H04L 69/24 |
| | | | | 709/250 |
| 2006/0129666 | A1* | 6/2006 | Bohm | H04L 41/0613 |
| | | | | 709/223 |
| 2012/0119902 | A1* | 5/2012 | Patro | H04L 12/12 |
| | | | | 340/502 |
| 2012/0297087 | A1* | 11/2012 | Humble | H04L 41/0213 |
| | | | | 709/238 |
| 2014/0155112 | A1* | 6/2014 | Molnar | H04L 65/1016 |
| | | | | 455/466 |
| 2015/0063212 | A1* | 3/2015 | Nirantar | H04W 76/045 |
| | | | | 370/328 |
| 2015/0341216 | A1* | 11/2015 | Cooppan | H04L 41/0816 |
| | | | | 709/221 |
| 2015/0362984 | A1* | 12/2015 | Waters | G06F 1/3287 |
| | | | | 713/324 |
| 2017/0339638 | A1* | 11/2017 | Szewczyk | H04W 52/0216 |

OTHER PUBLICATIONS

Wikipedia, "GSM 03.40", Oct. 22, 2014, 11 pages (Year: 2014).*
SMS Forum, Short message peer-to-peer protocol specification, Version 5. 166 pp. (Feb. 19, 2003).
WAP, Push Architectural Overview Version 03, 24 pp. (Jul. 2001).
WAP, Push OT Protocol Version 25, 44 pp. (Apr. 2001).
WAP Forum, Wireless Application Protocol WAP 2.0 Technical White Paper. 13 pp. (Jan. 2002).

* cited by examiner

METHOD AND APPARATUS FOR DEVICE MANAGEMENT

CROSS-REFERENCE TO RELATED APPLICATIONS

The present disclosure is related to and claims priority from U.S. Provisional Patent Application Ser. No. 62/145,901, entitled Method and Apparatus for Device Management and filed on 10 Apr. 2015, the entire contents of which are incorporated by reference herein.

TECHNICAL FIELD

The present invention relates generally to the field of communication networks and, more particularly, to a method and apparatus for facilitating the remote management of network devices.

BACKGROUND

The following abbreviations are herewith expanded, at least some of which are referred to within the following description of the state-of-the-art and the present invention.

| | |
|---|---|
| DM | Device Management |
| NI | Network Initiated |
| UI | User Initiated |
| SMS | Short Message Service |
| WAP | Wireless Application Protocol |

Mobile devices operate in wireless access networks by radio communication with nearby base stations, which are in turn connected to a core network or networks. These networks track to location of mobile devices so that communication sessions to and from each device may be successfully executed.

In early mobile communications, mobile devices were often basic radio devices manufactured in a configuration that would remain relatively static throughout the lifetime of the device. Changes or upgrades could be accomplished if necessary, often by a technician at a service facility.

More recently, mobile devices have become more sophisticated and capable of a larger number of functions. Alterations and upgrades are both more frequent and desirable than in the past Improvements in both the mobile devices and the communication networks have made it possible to perform many of these alterations, and to troubleshoot malfunctioning devices, remotely via the communication network.

A remote device manager, often centrally located to service a great many mobile devices, may be used to not only send upgrades but to monitor the status of a mobile device and perform troubleshooting functions. User participation is often not required for such operations, meaning they can typically be executed whenever the device is accessible through the network. The chance for human error is also greatly reduced.

Note that the techniques or schemes described herein as existing or possible are presented as background for the present invention, but no admission is made thereby that these techniques and schemes were heretofore commercialized or known to others besides the inventors.

SUMMARY

The present disclosure is directed at a manner of managing remote devices, such as mobile phone or similar devices used by subscribers in a mobile communication network. Such mobile devices may include device management clients, that is, modules residing on the mobile device and having the purpose of facilitating management of the device by a remote device manager.

In practice, however, it has been known for a device management client to become unresponsive, that is, to enter a non-responsive state. The typical remedy for this is a restart of the mobile device or the client or both by the subscriber. This solution has apparent drawbacks, for example requiring the users' physical presence and providing an opportunity for error.

In order to address this shortcoming in present mobile systems the inventors have developed a procedure for managing devices even when they may enter a non-responsive state. In accordance with one aspect of the present invention, a remote device manager determines that a remote device should participate in a remote device management transaction. A device management initiation message, for example, an SMS wake-up message is initiated and forwarded to the mobile device. After a period of time passes, the remote device manager determines whether the mobile device management client has responded to the device management message. If so, a data call tunnel is established and the device management transaction is performed.

In this aspect if, on the other hand, the mobile device management client does not respond, a device management client reset message is sent. In a preferred embodiment, the device management client reset message is an SMS WAP Push message. Subsequent to sending the device client management reset message, and preferably also subsequent to a pre-determined delay following sending the reset message, an additional device management initiation message is sent. If the device management client has responded subsequent to transmission of the additional device management initiation message, a data call tunnel is established and the device management transaction is performed.

In another aspect the solution includes apparatus such as a device management server configured to perform the operations of the method described above. The device management server may include a processor, a memory, and a network interface for communicating with managed devices. The device management server may also include a device management initiation message generator for generating device management initiation messages for sending via the network interface to the targeted managed device. The device management server may also include a device management client reset message generator for generating a device management client reset message to be sent, for example, if the device management initiation message is unsuccessful. A device management initiation timer may be included to assist in determining if a device management initiation message has been successful, and device management client reset timer may also be present to assist in the determination of when an additional client management initiation message should be sent subsequent to sending a device management client reset message.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
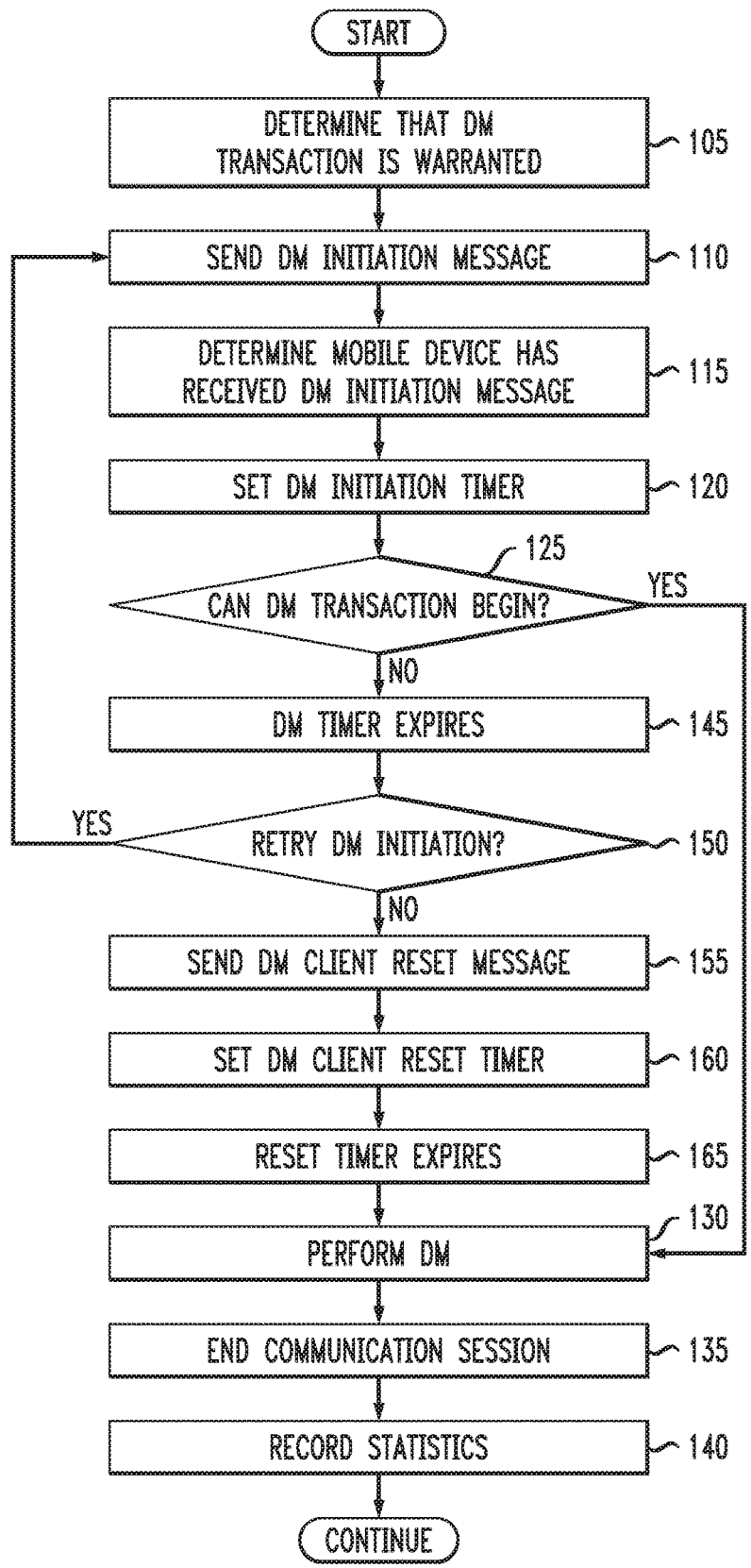
FIG. 1 is a flow diagram illustrating a method of device management according to an embodiment of the present invention.

The present disclosure is directed at a manner of managing remote devices such as mobile phones or similar devices used by subscribers in a mobile communication network. FIG. 1 is a flow diagram illustrating a method 100 of remote device management according to an embodiment of the present invention. At Start, it is presumed that the necessary components are provided and operational at least according to this embodiment. The process then begins when a determination is made in a device management server that a device management transaction with a mobile device is warranted (step 105). This determination may occur, for example, according to an established schedule, by direction from another entity in or outside of the communication network, or due to an alert raised in response to a problem detected in the network. The device management transaction may be necessary, desirable, or merely routine.

When the determination is made at step 105 that a device management transaction is warranted, the device management server sends a management initiation message toward the remote mobile device (step 110). The management initiation message may be, for example, a SMS WAP wake-up message. The message, of course, is relayed from the device management server though the mobile network to a base station and antenna where the mobile device is believed to be located.

In most implementations, a mobile device upon receiving the device management initiation message will respond, for example by transmitting a Layer 2 SMS ACK or a Layer 3 data burst response, or both. In a preferred embodiment, the device management server receives an indication from the mobile network that some form of the response has been received (step 115), indicating that the mobile device has received the message.

If it appears that the mobile device has not received the device management initiation message at all then the device management server may, for example, retry the transmission, perhaps after some delay, or notify the mobile network that the mobile device may be unavailable. The mobile device manager may make a record of the unavailability, for example by sending a message to a database server with which it is communication.

In the embodiment of FIG. 1, it is presumed that the device manager determines at step 115 that the device management initiation message was received by the target mobile device. In this case a timer is set (step 120) for the device management transaction. In this embodiment, the timer is set for a pre-determined time that will vary by implementation, and is used in the determination (step 125) of whether performance of the device management transaction may begin; that it, whether the device management initiation message is being acted upon by the mobile device. In this embodiment, this occurs when the device management server receives an indication that a data call tunnel has been established between the mobile device and the mobile network.

In this embodiment, if a data call tunnel is established then the device manager performs the remote device management transaction (step 130) in cooperation with the device management client on the mobile device. The data call tunnel can then be taken down (step 135), and statistics related to the remote mobile device transaction are sent (step 140) to a database for recording.

In this embodiment, if the timer set at step 120 expires (step 145) and no data call tunnel has been established, then the device management server determines (step 150) whether to send another remote device management message. This determination may be made on a variety of factors, for example how many such messages have been sent without a device management transaction being executed.

In some implementations, for example, another device management message may be sent unless three such messages have been sent in the previous hour, each provoking a layer 2 or layer 3 response but not resulting in a data call tunnel being established. Other factors may include the presumed location of the mobile device, level of traffic, whether this mobile device has required multiple device management initiation calls in the past, the type of service available (2G/3G/4G, LTE), and so forth. If the device management server determines to send another device management message, then the process returns to step 110.

In this embodiment, if on the other hand the device management server determines not to send another device management initiation message at this time, then in most cases a device management client reset message is sent (step 155). The device management client reset message is used to prompt the device management client on the mobile station to re-initialize and, hopefully, become responsive to further attempts to cooperate in performing a device management transaction.

When the device management client resent message has been sent, a device management client reset timer may also be set (step 160). Again the duration of this timer may vary from one implementation to the next, or even within a given implementation.

In some implementations, when a device management client reset message is sent at step 155, a determination is made (not shown in FIG. 1) whether it was received at the mobile device. Again, this may involve a report from the mobile network that the mobile device responded to the device management client reset message with a layer 2 or layer 3 response, or both. If the response has not been received, then and the management server may return to step 155 and send the message again. In some embodiments, a maximum number of reset messages may be established.

In the embodiment of FIG. 1, presuming a response to the client reset message has been received from the mobile device, upon expiration of the reset timer set at step 165, the device manager sends an additional device management initiation message to the mobile device via the mobile network, returning to step 110.

In this manner the device manager may manage the mobile device by addressing the problem of a non-responsive mobile device without in many cases having to prompt the subscriber to perform some diagnostic or corrective actions.

Note that the sequence of operation illustrated in FIG. 1 represents an exemplary embodiment; some variation is possible within the spirit of the invention. For example, additional operations may be added to those shown in FIG. 1, and in some implementations one or more of the illustrated operations may be omitted. In addition, the operations of the method may be performed in any logically-consistent order unless a definite sequence is recited in a particular embodiment.

Figure 2:
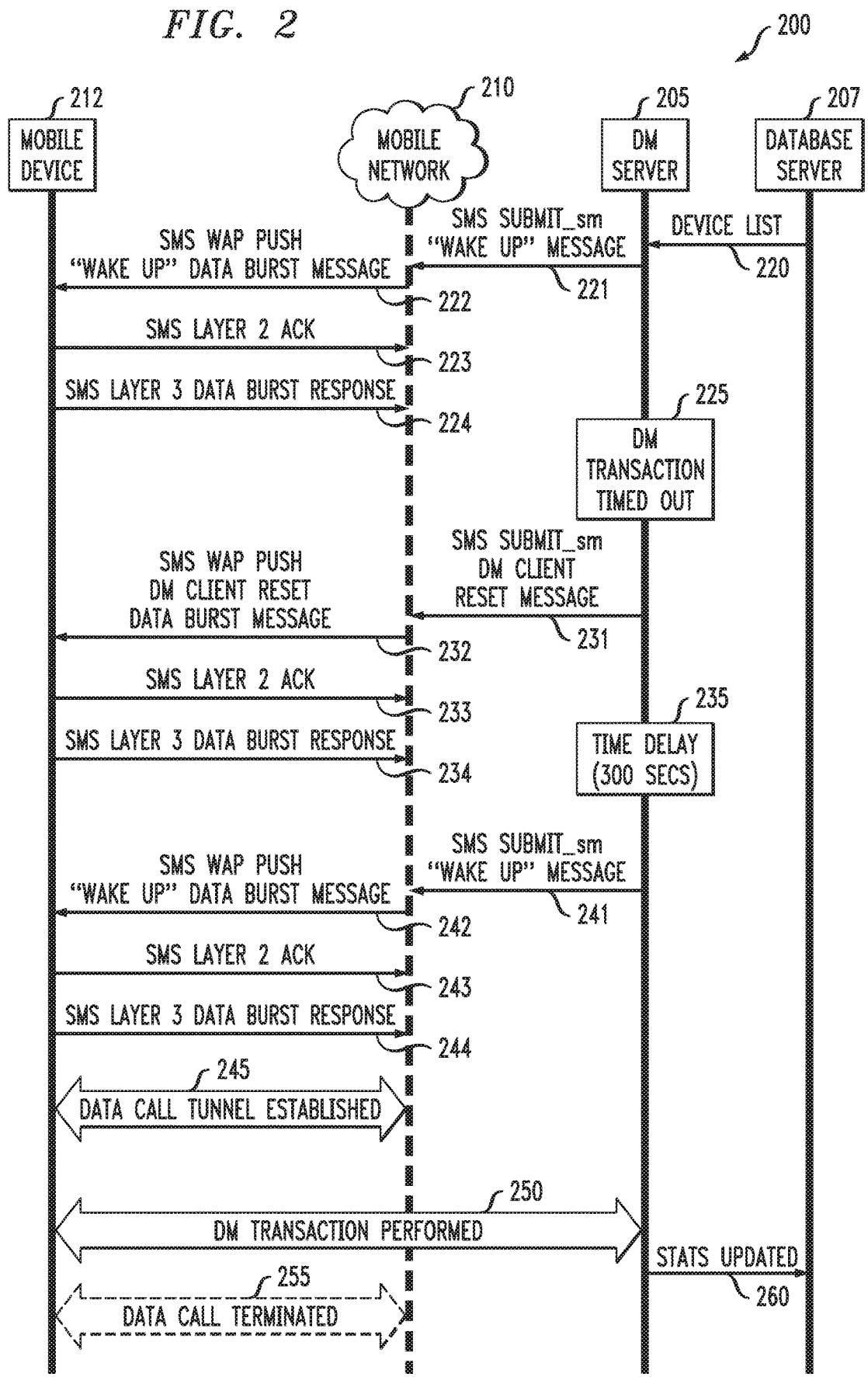
FIG. 2 is a message flow diagram illustrating a device management method according to another embodiment of the present invention.

FIG. 2 is a message flow diagram 200 illustrating a device management method according to another embodiment of the present invention. Exchanging messages in this embodiment are a device management (DM) server 205, a database server 207, and a mobile device 212. Device management server 205 and mobile device 212 exchange messages via a mobile network 210, shown here as a cloud because there may be any number of nodes involved in the communication, for example gateways, switches, and base stations. Either device management server 205 or database server 207, or both, may communicate with each other or the mobile network via the Internet. Although shown as separate nodes in FIG. 2, they may not be physically separate components in all implementations. Note that FIG. 2 is similar but not necessarily identical to the process illustrated in FIG. 1.

In the embodiment of FIG. 2, device management server 205 receives a device list 220 from database server 207 in a message indicating that a remote device management transaction is warranted for at least one mobile device. Frequently there may be many devices on the device list 220, but this description will for clarity discuss only one device; mobile device 212. Upon receiving the device list 220, device management server 205 sends a device management initiation message, in this case an SMS submit_sm wake up message 221 to the mobile network 210.

In this embodiment, the mobile network 210 then sends to the mobile device 212 an SMS WAP push wake up data burst message 222. Presuming the mobile device 212 is operational in the mobile network 210, it responds with and SMS layer 2 ACK 223, indicating receipt of message 222. As in many implementations, it also, generally later, sends an SMS layer 3 data burst response message 234, which is also indicative of receiving wake-up message 222.

In the embodiment of FIG. 2, when device management server 205 sends device management message 221, it sets a device management transaction timer. If this timer expires 225 and the relevant device management transaction has not been performed, the device management server 205 sends a client reset message, in this case an SMS_sm device management client reset message 231, to the mobile device 212 via mobile network 210.

In this embodiment, the mobile network 210 then sends to the mobile device 212 an SMS WAP push device management client reset data burst message 232. Again presuming the mobile device 212 is operational in the mobile network 210, it responds with and SMS layer 2 ACK 233, indicating receipt of message 232. As in many implementations, it also, generally later, sends an SMS layer 3 data burst response message 234, which is also indicative of receiving wake-up message 232.

In the embodiment of FIG. 2, when device management server 205 sends client reset message 231, it sets a client reset timer. When this timer expires 235, the device management server 205 sends a device management initiation message, again in this case an SMS submit_sm wake up message 241 to the mobile network 210.

In this embodiment, the mobile network 210 then sends to the mobile device 212 an SMS WAP push device management client reset data burst message 242. Again presuming the mobile device 212 is operational in the mobile network 210, it responds with and SMS layer 2 ACK 243, indicating receipt of message 232. As in many implementations, it also, generally later, sends an SMS layer 3 data burst response message 244, which is also indicative of receiving wake-up message 232.

In the embodiment of FIG. 2, it is presumed that the device management client reset message 232 has successfully prompted the mobile device 212 to reset the device management client and that the client is now in a responsive state. A data call tunnel is established 245 between the mobile device 212 and the mobile network 210 and the device management transaction 250 may be performed. Once the device management transaction 250 has been completed, the data call may be terminated 255 and statistics related to the remote mobile device transaction sent 260 to a database for recording.

Note that the sequence of message flow illustrated in FIG. 2 represents an exemplary embodiment; some variation is possible within the spirit of the invention. For example, additional messaging may be added to that shown in FIG. 2, and in some implementations one or more of the illustrated messages may be omitted. In addition, the messages of the method may be transmitted and received in any logically-consistent order unless a definite sequence is recited in a particular embodiment.

Figure 3:
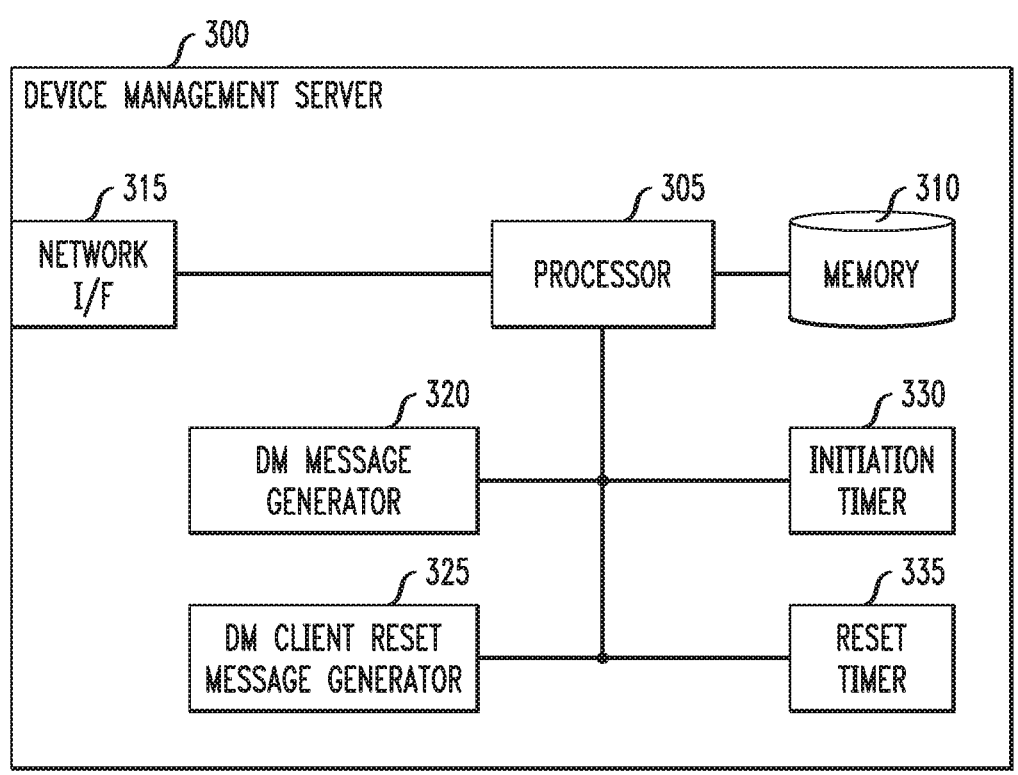
FIG. 3 is a simplified block diagram illustrating selected components of a device management server according to an embodiment of the present invention.

FIG. 3 is a simplified block diagram illustrating selected components of a device management server 300 according to an embodiment of the present invention. In this embodiment, device management server 300 includes a processor 305 and memory 310. Memory device 310 in this embodiment is a physical storage device that may in some cases operate according to stored program instructions. In any case, memory 310 is non-transitory in the sense of not being merely a propagating signal. Memory 310 is used for storing, among other things, data such as a table (not separately shown) of managed devices as well as stored program instructions for execution by processor 305. Processor 305 generally controls the operation of the components of management server 300 and may be implemented in hardware or software running program instructions, or both.

In the embodiment of FIG. 3, device management server also includes a network interface 315 for communicating via a network (not shown) with managed devices, and also in some cases a database server or other network nodes. Shown separately in FIG. 3 is a device management initiation message generator 320 for generating messages to devices when a determination has been made that a management transaction with that device is warranted. Also illustrated is a device management client reset message generator 325 for generating messages for transmission to managed devices when a device management initiation message has been unsuccessful, as described above in reference to FIGS. 1 and 2. Also described above are the operation of device management initiation timer 330 and device management client reset timer 335, which are also illustrated in FIG. 3.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of managing a remote device, comprising:
   determining by a network node that a device management transaction is required with respect to at least one remote device;
   sending from the network node a first device management initiation message to the at least one remote device;
   initiating a device management initiation timer;
   determining whether the at least one remote device has initiated a management communication session;
   performing, in response to a determination that the at least one remote device has initiated a management communication session, the device management transaction; and
   in response to a determination that the at least one device has not initiated a management communication session after expiration of the device management initiation timer, generating by the network node a device management client reset message and generating another device management initiation message for transmission to the at least one remote device.

2. The method managing a remote device of claim 1, further comprising: sending to the at least one remote device, subsequent to sending the first device management initiation message and prior to sending the device management client reset message, an additional device management initiation message.

3. The method managing a remote device of claim 1, wherein the first device management initiation message is an SMS message.

4. The method managing a remote device of claim 1, further comprising determining whether the device management transaction may begin.

5. The method managing a remote device of claim 4, wherein determining whether the device management transaction may begin comprises determining whether the first device management initiation message was received by the at least one remote device.

6. The method managing a remote device of claim 4, wherein determining whether the device management transaction may begin comprises determining whether a data call tunnel has been established.

7. The method managing a remote device of claim 4, further comprising sending an additional device management initiation message prior to sending the device management client reset message if it is determined that the device management transaction may not begin.

8. The method managing a remote device of claim 1, wherein the device management client reset message is an SMS message.

9. The method managing a remote device of claim 1, further comprising updating the statistical record for the at least one remote device.

10. A device management node, comprising:
    a network interface configured to communicate to a mobile device over a mobile network; and
    at least one processor configured to:
      generate a device management initiation message for transmission over the mobile network to the mobile device;
      initiate a device management transaction timer;
      determine that the mobile device has not initiated a management communication session and the device management transaction timer has expired;
      generate a device management client reset message for transmission over the mobile network to the mobile device; and
      generate another device management initiation message for transmission over the mobile network to the mobile device.

11. The device management node of claim 10, wherein the at least one processor is further configured to:
    when the device management client reset message is transmitted, initiate a device management client reset timer; and
    in response to expiration of the device management client reset timer, generate the another device management initiation message for transmission over the mobile network to the mobile device.

12. The device management node of claim 10, wherein the at least one processor is configured to generate the device management client reset message by generating an instruction in the device management client reset message to re-initialize a device management client of the mobile device.

13. The device management node of claim 12, wherein the device management client reset message is an SMS message.

14. A device management node, comprising:
    a network interface configured to communicate to a mobile device over a mobile network; and
    at least one processor configured to:
      generate a device management initiation message for transmission over the mobile network to the mobile device;
      initiate a device management transaction timer;
      determine that the mobile device has not initiated a management communication session and the device management transaction timer has expired;
      determine whether to generate an additional device management initiation message for transmission over the mobile network to the mobile device;
      in response to determining not to generate the additional device management initiation message, generate a device management client reset message for transmission over the mobile network to the mobile device; and
      generate another device management initiation message for transmission over the mobile network to the mobile device.

15. The device management node of claim 14, wherein the at least one processor is further configured to:
    when the device management client reset message is transmitted, initiate a device management client reset timer; and
    in response to expiration of the device management client reset timer, generate the another device management initiation message for transmission over the mobile network to the mobile device.

16. The device management node of claim 14, wherein the at least one processor is further configured to:
    determine that no response to the device management client reset message is received from the mobile device; and
    generate another device management client reset message for transmission over the mobile network to the mobile device.

17. The device management node of claim 14, wherein the at least one processor is configured to generate the device management client reset message by generating an instruction in the device management client reset message to re-initialize a device management client of the mobile device.

18. The device management node of claim 14, wherein the at least one processor is configured to determine whether to generate an additional device management initiation message for transmission over the mobile network to the mobile device using one or more of:
- a number of previous device management initiation messages;
- a presumed location of the mobile device;
- a level of traffic; or
- a type of service available.

* * * * *